US012587415B2

(12) United States Patent
Bezen et al.

(10) Patent No.: US 12,587,415 B2
(45) Date of Patent: Mar. 24, 2026

(54) LOCAL PORT GROUPING WITH RAILS OF NETWORK LINKS

(71) Applicant: MELLANOX TECHNOLOGIES, LTD., Yokneam (IL)

(72) Inventors: Lior Hodaya Bezen, Tel Aviv (IL); Alex Netes, Rehovot (IL); Mark Hummel, Franklin, MA (US); Glenn Dearth, Groton, MA (US); Lion Levi, Yavne (IL)

(73) Assignee: Mellanox Technologies, Ltd., Yokneam (IL)

( * ) Notice: Subject to any disclaimer, the term of this patent is extended or adjusted under 35 U.S.C. 154(b) by 235 days.

(21) Appl. No.: 18/162,195

(22) Filed: Jan. 31, 2023

(65) Prior Publication Data

US 2024/0259234 A1 Aug. 1, 2024

(51) Int. Cl.
H04L 12/46 (2006.01)
H04L 49/356 (2022.01)
(52) U.S. Cl.
CPC ........ H04L 12/4675 (2013.01); H04L 49/358 (2013.01)

(58) Field of Classification Search
CPC ..................................................... H04L 49/358
USPC ........................................................ 370/252
See application file for complete search history.

(56) References Cited

U.S. PATENT DOCUMENTS

2021/0021444 A1* 1/2021 Barabash ............ G06F 9/45541

FOREIGN PATENT DOCUMENTS

CN 115174671 A * 10/2022 ........... H04L 67/288

* cited by examiner

*Primary Examiner* — Sibte H Bukhari
(74) *Attorney, Agent, or Firm* — Hogan Lovells US LLP

(57) ABSTRACT

Systems and methods herein are for one or more processing units to communicate configuration information between a subnet manager (SM) and at least one switch, where the configuration information is to enable the at least one switch to provide communication between at least two host machines through a number of network links that exclusively use two or more physical ports of the at least two host machines, and where the configuration information is associated with a mapping of different virtual network addresses and two or more physical ports and is associated with a relationship between the different virtual network addresses.

18 Claims, 7 Drawing Sheets

LOCAL PORT GROUPING WITH RAILS OF NETWORK LINKS

TECHNICAL FIELD

At least one embodiment pertains to communication in InfiniBand (IB) networks. For example, an subnet manager (SM) enables network links that exclusively use two or more physical or local ports of the host machines for IB communication.

BACKGROUND

Infiniband (IB) networks may be used in high-performance computing and data centers. IB networks may be a switched fabric network that uses a high-bandwidth and low-latency communication protocol referred to as Remote Direct Memory Access (RDMA) to allow devices to communicate directly without a host. This allows for very fast communication speeds and low latency, making it well-suited for applications that require high-speed data transfer and low-latency communication, such as financial trading systems, high-performance computing, and other time-sensitive applications. In IB networks, communication occurs using a series of interconnected switches, which are responsible for routing data packets between devices. Distinct identifiers used to identify IB ports can limit a number host machines able to communicate on an IB network but also require substantial control bits to ensure an intended configuration in the switched fabric network for communications between such host machines.

DETAILED DESCRIPTION

Figure 1:
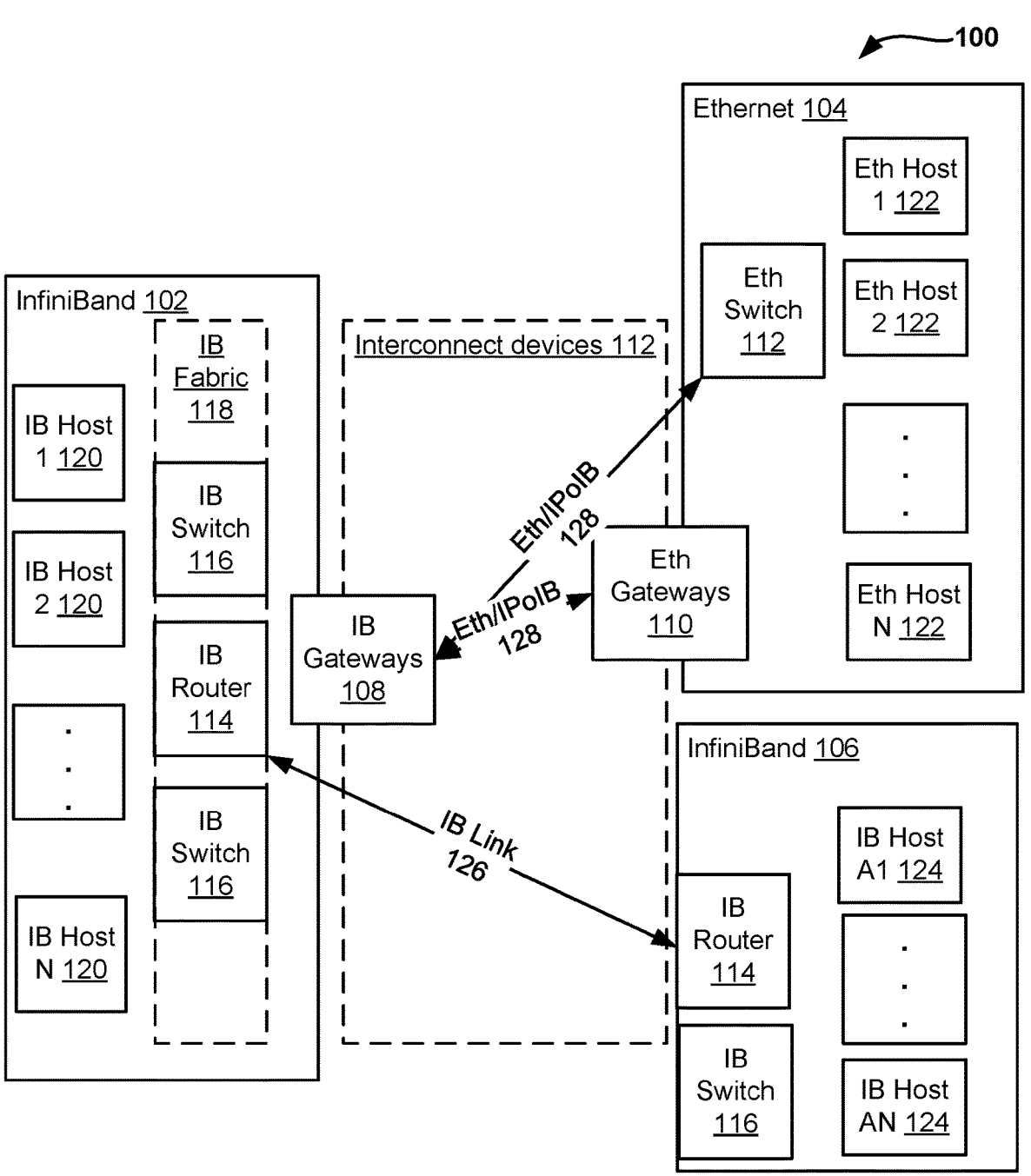
FIG. 1 illustrates a system that is subject to local port grouping for rails of network links in InfiniBand (IB) networks, according to at least one embodiment.

In at least one embodiment, FIG. 1 illustrates a system 100 that is subject to local port grouping for rails of network links in InfiniBand (IB) networks, as detailed herein. A local port is used interchangeably with a physical port herein. The system 100 enables local port grouping in an abstraction referred to as rails of network links between such local port groups in two host machines. The network links exclusively use the physical ports that are grouped together for IB communication between the host machines.

The grouping of local ports to provide the rails of network links is an abstraction, along with addressing provided for such local ports, in order to control a forwarding of IB communication in larger granularity for IB networks. This reduces a number of overall LIDs used in an IB network and allows for connections between more hosts, as well as creates efficient forwarding schemes for IB switches (such as, by reducing hash bits required for IB communication between two host machines because of the local ports reduced by the rails of abstracted network links).

The rails of network links exclusively use the physical ports that are part of the rails of network links for communication between at least two host machines in IB networks. However, IB switches between the two host machines may use different groups of ports to direct IB communication between the IB switches. For example, the rails of network links use distinct individual physical network addresses (local identifiers (LIDs)) associated with individual physical ports of different host machines that may be grouped together. The distinct LIDs by itself can result in a congested port/switch for communications between different host machines across an IB network.

Therefore, first, virtual network addresses (or virtual LIDs) may be used instead of individual physical LIDs to address limited physical LIDs available for at least multi-port end-nodes. In at least one embodiment, a multi-port end-node, such as a multi-port endpoint or a multi-port high channel adapter (HCA), may be LID-consuming even if they can reserve knowledge of an exact destination port. Each virtual LID may represent multiple physical LIDs, for instance. Second, relationships between such virtual LIDs may be registered, where each relationship represents a rail of network links to make exclusive certain physical ports, which can address limitations in a number of host machines and number of ports available for communication in an IB network.

In at least one embodiment, rails of network links can also reduce the number of control bits required to ensure configuration in a switched-network fabric without having to communicate broadly, also referred to as a network spray, to multiple ports of multiple host machines. This approach also enables a uniform spreading of network traffic in the switched-network fabric by conserving the network spray from many ports to a limited number of ports.

In at least one embodiment, the communication using rails of network links is in reference to individual physical ports of at least two host machines that are part of a rail of network links so that they are exclusively used in the rail of network links between the at least two host machines. The assignment of virtual LIDs and the relationship between the virtual LIDs may be based in part on one or more of the at least two host machines requesting to communicate with each other. The assignment and the relationship of the virtual network addresses are registered in the SM and are passed to one or more switches between a communication path of the at least two host machines to enable in part the rails of network links.

In at least one embodiment, the relationship is stored in a rail-based forwarding table of an SM. The rails can divide an IB network into smaller isolated networks so that traffic in the smaller isolated networks cannot be mixed. In a use case of a multi-port endpoints or a multi-port high channel adapters (HCAs), each multi-port HCA can request that a local port be assigned with a rail such that all of a switched-fabric's multi-port HCAs' local port 1 are isolated from other local ports (such as ports 2, 3, to N), as available in each switched-fabric's multi-port HCA. In at least one embodiment, therefore, there may be groups of local ports between at least two host machines that are part of a rail, whereas there may be other local ports between the same at least two host machines that are not part of a rail and can receive traffic outside the rail of network links established for the at least two host machines.

A rail optimizes a nature of the switched fabric, which is the use of virtual LIDs assigned to each endpoint. This approach enables multiple physical LIDs (ports) of a multi-port HCA to be addressed using a single virtual LID. As a result of this approach, traffic that is intended for a specific destination port is received in the destination port based in part on a source port of the traffic, as described further with respect to one or more of the figures herein. This approach eliminates a need to use distinct physical LIDs to direct traffic to each one of the endpoint ports.

In FIG. 1 multiple IB host machines 120, 124 of different IB networks 102, 106 may interface with each other using IB switches 116 and IB routers 114; but may also support interfacing between an IB network 102; 106 and an ethernet network 104 using interconnect devices 112. For an ethernet network 104, an ethernet switch 112 and ethernet gateways 110 may coordinate connectivity within the ethernet network 104 and may coordinate connectivity between different ethernet host machines 122 of the ethernet network 104 and other networks, such as an IB network 102; 106 using ethernet over IB protocols 128. Differently, in an IB network 102; 106, each subnet 102, 106 relies on a subnet manager (SM) and subnet management agents (SMAs) to coordinate network connectivity among different IB host machines 120; 124 that communicate using IB links 128. Further, the SM may be implemented on an IB switch 116 or on at least one of the IB host machine 120; 124, where at least one SM is provided in each subnet 102; 106.

Figure 2:
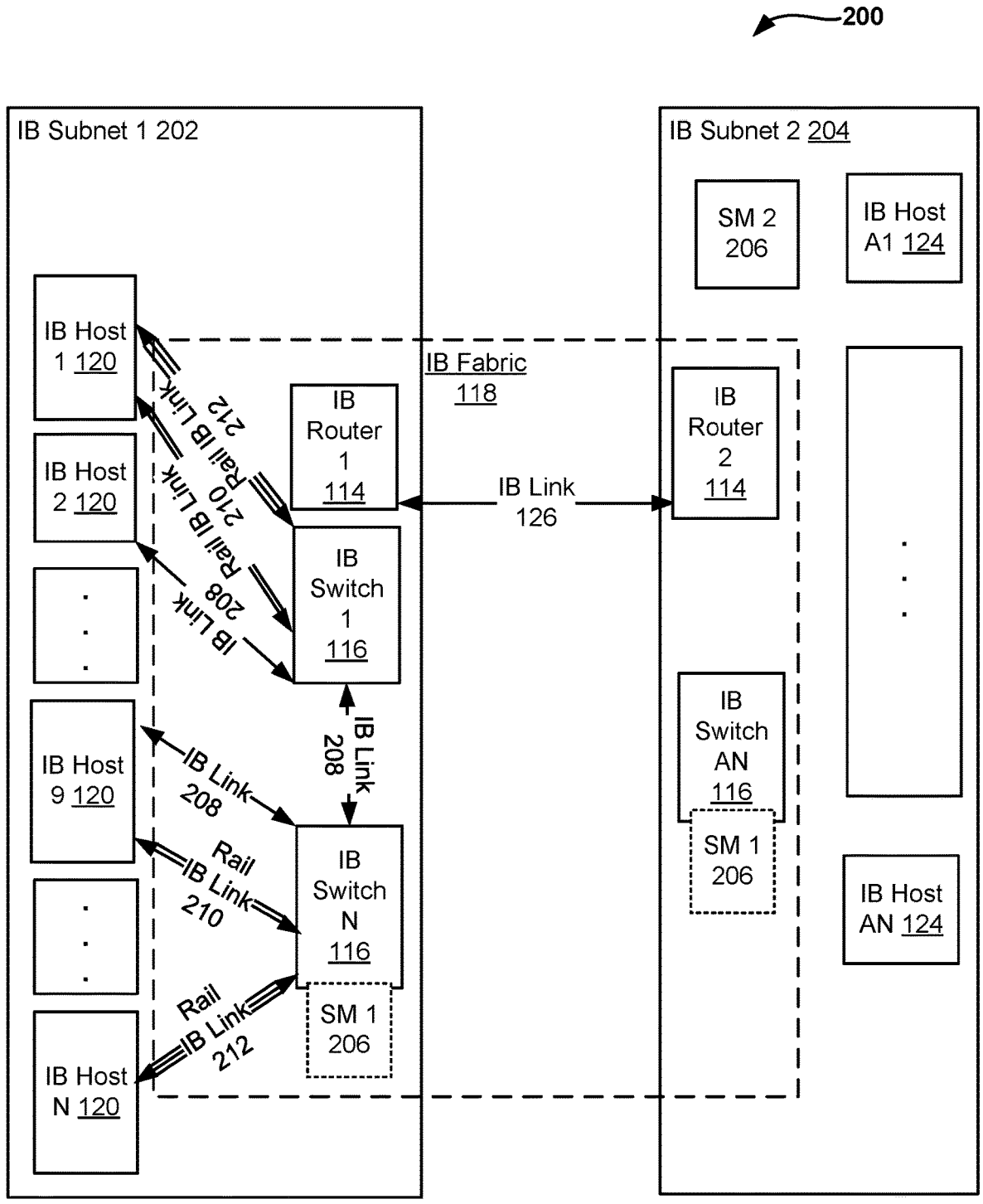
FIG. 2 illustrates IB management aspects of a system for local port grouping for rails of network links in IB networks having multiple subnets, according to at least one embodiment.
Figure 3:
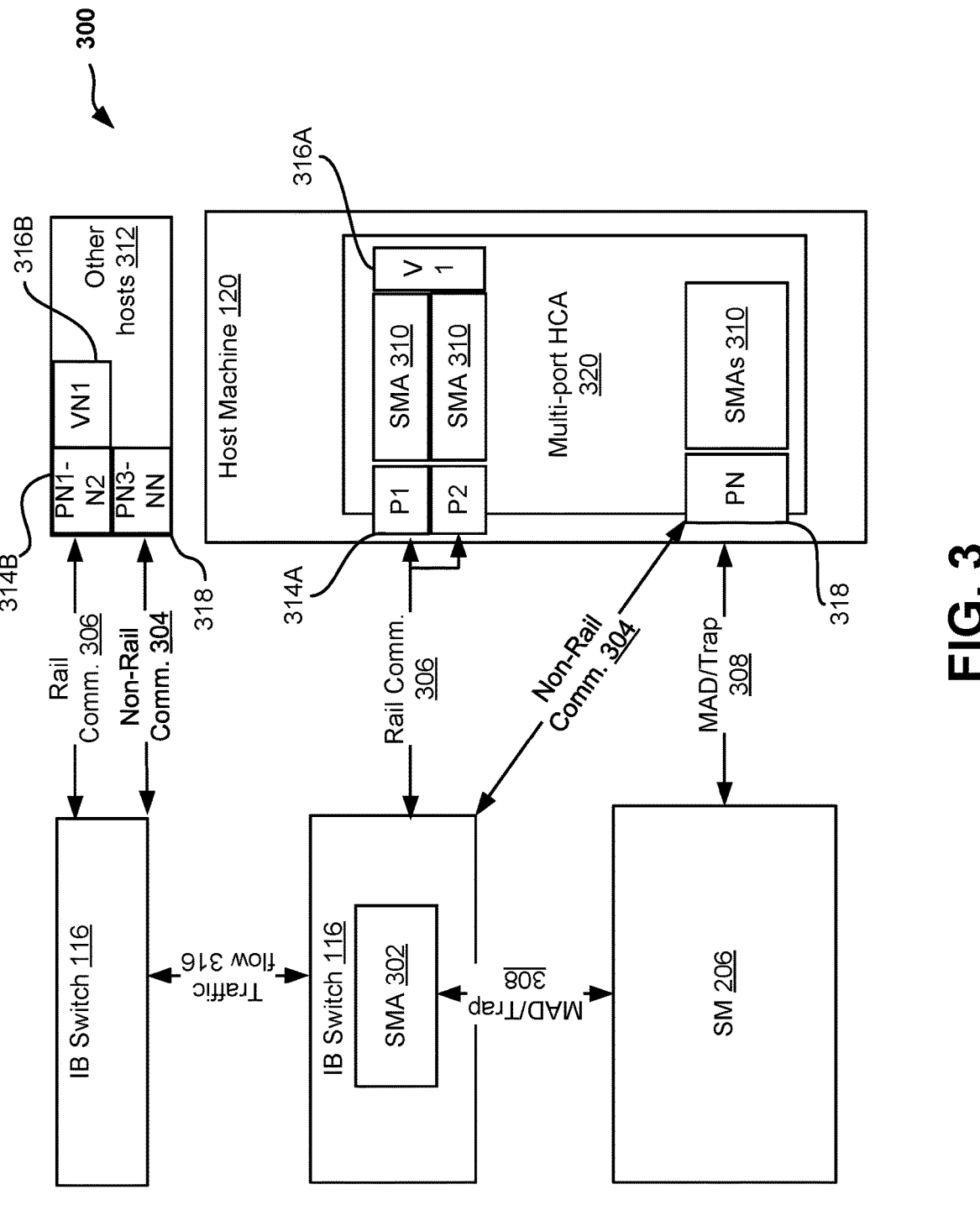
FIG. 3 illustrates further aspects of a system for local port grouping for rails of network links in IB networks using a subnet manager (SM), according to at least one embodiment.
Figure 4:
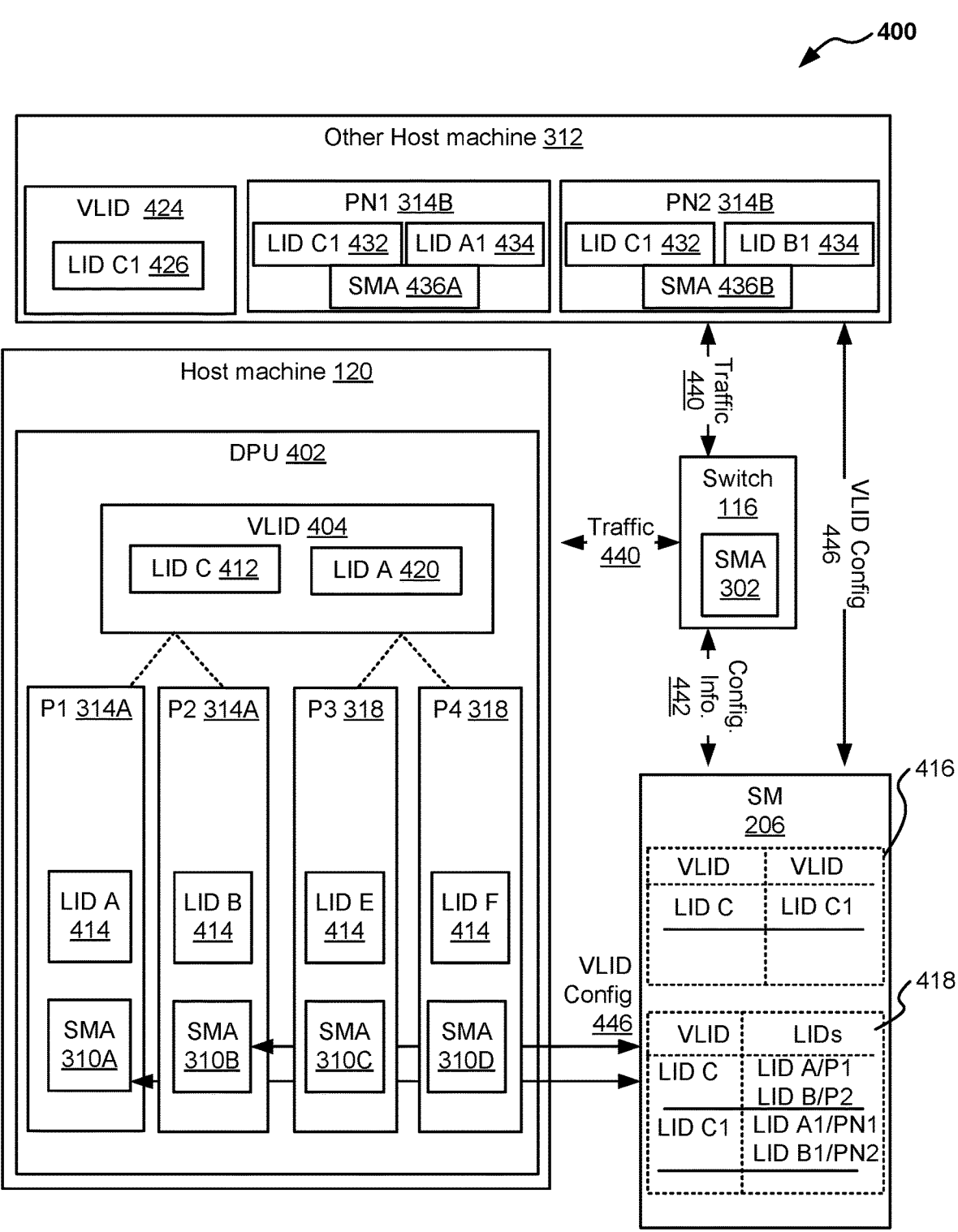
FIG. 4 illustrates still further aspects of a system for local port grouping for rails of network links in IB networks using an SM having a mapping of different virtual network addresses and a relationship between the different virtual network addresses, according to at least one embodiment.

In one example, because an IB network 102 includes SMs and SMAs, such as illustrated and/or discussed with respect to at least FIGS. 2-4, these aspects are used to monitor link states of IB ports within IB hosts 120, 124. Further, an SM 206 (in FIG. 2) is used to configure internal forwarding tables of an IB switch 116 via an SMA 302 (in FIG. 3). As such, when establishing a mapping of virtual LIDs and establishing a relationship between the virtual LIDs, the SM must be notified so that it can configure one or more IB switches 116 using the mapping and the relationship that are part of a rail-based forwarding table. An IB switch routes IB packets from one IB link to another IB link in a same IB subnet, such as within each of subnets 202; 204 in FIG. 2. An IB router can route packets between the subnets 1, 2 202, 204 in FIG. 2.

FIG. 2 illustrates IB management aspects 200 of a system for local port grouping for rails of network links in IB networks 202, 204 having multiple subnets, according to at least one embodiment. In at least one embodiment, the system and method herein allow establishing, modifying, and monitoring of the mapping and the relationship for rails of network links through an SM 206 and at least one subnet management agent (SMA) (such as, SMA 302 in FIG. 3 and the associated description). A host is used interchangeably with a host machine to describe an IB or ethernet host unless stated expressly otherwise using preceding text IB or ethernet or with respect to aspects that are IB-related versus aspects that are ethernet-related, where an IB host is exclusively within an IB network and an ethernet host is exclusively within an ethernet network. Further, such exclusivity does not restrict IB to ethernet communications as described throughout herein.

In FIG. 2, IB aspects of interconnect devices 112 may represent an IB fabric 118 and can at least include multiple IB switches 116 and one or more IB routers 114. Such an IB fabric 118 allows one or more IB hosts 120, 124 to communicate within a subnet or across subnets over one or more designated IB links 126. Even though illustrated via IB routers, an IB link 208 can couple together IB switches. These IB host machines may be within a same subnet or in different subnets, as described further with respect to at least FIG. 2.

In abstraction, an IB link 126; 208 may be bound to a physical IB port of an IB host 120, but such IB links 126; 208 may be network links that are not associated with specific physical IB ports, where IB packets are sent between available physical IB ports of a sender host machine and a receiver host machine. Separately, instead of such non-exclusive (non-rail) IB links 126; 208, rails of network links 210; 212 provide communications that is exclusively between physical IB ports of two different IB hosts 1-N 120 of an IB subnet 1 202 or between two different IB hosts A1-AN 124 of a different IB subnet 2 204. Therefore, a rail network links may be used interchangeably with a network link having exclusive use of physical ports based in part on a mapping and on a relationship registered in at least an SM 206.

Therefore, local port grouping may be enabled for IB host machines 120, 124 in each subnet 202, 204 so that at least two IB host machines 120, 124, in their respective subnets 202, 204, can have their ports associated together to form a rail of network links between the at least two IB host machines. In one example, an SM 206 can include a mapping of different virtual network addresses to two or more physical network addresses of two or more physical ports on the at least two host machines, such as virtual LIDs of a first virtual port of a first IB host machine 1 120 and of a second virtual port of a second IB host machine 9 120 may be mapped to two or more of their respective physical ports. This allows multiple physical ports of each of the first IB host machine 1 120 and of the second IB host machine 9 120 to be independently grouped under individuals virtual LIDs.

Further, the SM 206 can also include a relationship between the different virtual LIDs, such as a relationship registered within the SM 206 and between a first virtual LID for the first virtual port of the first IB host machine 1 120 and a second virtual LID of the second virtual port of the second IB host machine 9 120. In at least one embodiment, the registration may be in the form of a rail-based forwarding table. The mapping and the relationship between the first virtual LID and the second virtual LID enable a number of network links 210 (double-lined to indicate exclusivity) between two or more physical ports, underlying the first virtual LID and the second virtual LID, for communication between the first IB host machine 1 120 and the second IB host machine 9 120.

In at least one embodiment, based on at least the relationship in the rail-based forwarding table, communication between the number of network links 210 is to exclusively use two or more physical ports of the underlying virtual LIDs; however other traffic 208 from other IB host machines 2, N 120, which are outside the relationship between the first IB host machine 1 120 and the second IB host machine 9 120 can be received through the other physical ports. In at least one embodiment, therefore, even with the mapping and the relationship between the first IB host machine 1 120 and the second IB host machine 9 120, each of these IB host machines may include physical ports that are open for IB links 208 for IB communications without being part of a rails of network links 210.

In at least one embodiment, there may be other groupings of other virtual LIDs to be part of other rails of network links 212 for communication between different IB host machines, such as a different rails of network links 212 between the first IB host machine 1 120 and a third IB host machine N 120 using different respective underlying local ports that are based in part on different mappings and relationships registered in an SM 206. Therefore, the SM 206 can also include a relationship (reference 416 in FIG. 4) between other virtual LIDs, such as a relationship registered within the SM 206 and between a third virtual LID for a third virtual port of the first IB host machine 1 120 and a fourth virtual LID of a fourth virtual port of a third IB host machine N 120. The mapping and the relationship between the third virtual LID and the fourth virtual LID enable a number of different network links 212 (triple-lined to indicate different exclusivity of underlying physical ports) to be used in communication between the first IB host machine 1 120 and the third IB host machine N 120. As these rails 210, 212 of network links enable sending and receiving IB packets between groups of physical or local ports via the mapping between the virtual ports and two or more respective physical or local ports and via the relationship between the virtual ports, local port grouping is achieved between such local port groups.

In at least one embodiment, the SM 206 provides configuration information to one or more SMAs of one or more IB devices between the SM and the host 120. For example, the configuration information can enable at least one of the IB devices (such as an IB switch 116) to configure its internal forwarding table based in part on the mapping and based in part on the relationship. This configuration information, by virtue of configured forwarding tables in the IB switches, can enable the rails 210, 212 of network links. While this is illustrated in IB subnet 1 202, this approach is possible in other subnets, such as a second IB subnet 204 using its own SM 206 and its own IB switches AN 116 for IB hosts 124. Communication between rails of network links having exclusive use the two or more physical ports can also extend between subnets via IB routers 114 that at least communicate IB packets between the subnets till they are locally communicated using the mapping and the relationship within their subnets. However, the benefit is realized from communication between network links having exclusive use the two or more physical ports that divides an IB network into smaller isolated networks so that traffic in the smaller isolated networks cannot be mixed.

FIG. 3 illustrates further aspects 300 of a system for local port grouping for rails of network links in IB networks using a subnet manager (SM) 206, according to at least one embodiment. The system is provided for local port grouping for at least two host machines 120, 312 in at least a subnet of an IB network 202; 204. An SM 206 can include a mapping of different virtual network addresses V1, VN1 316 (reflecting virtual LIDs C 412 and C1 432 in FIG. 4) to two or more physical network addresses (reflecting LIDs A, B 414, and A1, B1 434 in FIG. 4) of two or more physical ports P1, P2 314A and PN1, PN2 314B on the at least two host machines 120, 312. Further, the SM can include a relationship between the different virtual network addresses V1, VN1 316 to enable the rails 306 of network links that exclusively use the two or more physical ports P1, P2 314A and PN1, PN2 314B between the at least two host machines.

There may be other open or non-rail ports PN or PN3-NN 318 to support non-rail communication 304 between the same host machines. In at least one embodiment, in each of the at least two host machines 120; 312, the ports P1-PN, PN1-PNN 314A, 314B, 318 are ports associated with a multi-port HCA 320.

FIG. 4 illustrates still further aspects 400 of a system for local port grouping for rails of network links in IB networks using an SM 206 having a mapping 418 of different virtual network addresses (such as LID C 412 to LIDs A and B 414) and having a relationship 416 between the different virtual network addresses (such as LID C 412 and LID C1 432), according to at least one embodiment. In at least one embodiment, at least one switch 116 may be between the at least two host machines 120, 312 to receive configuration information 446 from the SM. Further, the configuration information may be associated with the mapping 418 and the relationship 416 of the different virtual network addresses 412, 432. In at least one embodiment, a local LID 414 (such as LID A) of a physical port 314A may be used as a virtual network address, such as illustrated with LID A 420 mapping against other physical network addresses LID E, LID F 414. Further, the local LID (such as LID A) may be mapped against itself and other physical network addresses LID E, LID F 414.

In at least one embodiment, instead of the physical network address, directed routing may be used where the mapping 418 in the SM 206 is between ports 314A, 318 by port numbers P1, P2, PN1, PN2 in a respective host machine 120 to the virtual network addresses 412, 432. In directed routing, a packet header may include local port numbers, according two vectors, such as a forward path and a response path. A class in the packet header may indicate which type of addressing is used, such as Class 1 indicating LIDs or Class 81 indicating directed routing. A number of hops between a sending host machine (or closest switch) and a receiving host machine (or closes switch) may be used to list, at each hop, what exit port to take. For example, a packet from a sending host machine and intended for a receiving host machine may require three hops to reach the receiving host machine. A packet header of such a packet may include a list of 1, 3, 5, indicating that at a first hop, the first exit port is used, at a second hop, a third exit port is used, and at a third hop, a fifth exit port is used. Therefore, at least the port numbers may be used in the mapping for the two or more physical ports to the virtual network addresses.

In at least one embodiment, the configuration information 446 can enable the at least one switch 116 to provide the communication between the at least two host machines 120, 134 through the rails 306 of network links. While generally illustrated as traffic 440, this traffic 440 can include exclusive rail traffic for exclusive physical ports and can include other non-rail traffic for non-exclusive physical ports from the switch 116. Further, while illustrated differently, the configuration information 446 is sent via the same switch 116 and the same physical ports addressable by the physical port addresses 314A, 314B, 318. The SM 206 may not be involved in traffic flow 440, whether using rails or non-rails communication or traffic, between the host machines 120, 312 through one or more IB switches 116.

In at least one embodiment, the mapping 418 and the relationship 416 may be in rail-based forwarding tables and are based in part on one or more of the at least two host machines 120, 134 requesting to communicate with each other and may be further based in part on the request including the use of a rail of network links. In at least one embodiment, the communication between the rails 306 of network links may not interfere with other traffic 304 from other host machines 134 that are outside the rails to be received through other than the two or more physical ports 314A, B that are in a rail of a network links between the at least two host machines 120, 312. For example, there may be other ports 318 of the at least two host machines 120, 312 and of other host machines to support non-rail communication 304.

In at least one embodiment, an interface of the SM is able to receive a request for the communication to use rails of network links between two host machines. The SM can update or register at least the relationship 416 between the different virtual network addresses based in part on the request. In at least one embodiment, the interface uses management datagram (MAD) messaging and trap messaging 308 and the SM is able to make updates to its rail-based forwarding tables. Further, an IB software service of the host machine or of an endpoint can enable the configuration information 446 to be communicated between the SM and a plurality of SMAs of the two or more physical ports using the MAD messaging 308.

In at least one embodiment, the SMAs 302, 310A-D, 436A, B can respond to at least the MAD messaging 308. For example, the SMAs can provide trap messaging 308 for notifying the SM 206 for the different virtual network addresses 412 to the two or more physical ports 314A, B. The SMAs can provide trap messaging 308 to request for the different virtual network addresses 412 to the two or more physical ports 314A, B. The SMAs can provide trap messaging 308 for notifying the SM 206 about changes to the different virtual network addresses 412 of the two or more physical ports 314A, B. The two or more physical ports 314A, B may be associated with two or more physical network addresses 414. The SMAs can also provide trap messaging 308 notifying about the communication.

In at least one embodiment, the MAD messaging 308 may include the two or more physical network addresses 414 of the two or more physical ports 314A, B in a source and destination address header field. In at least one embodiment, the SM 206 may be enabled to assign the virtual network addresses 412, 432 to the two or more physical ports 314A, B on the at least two host machines 120, 312, where the two or more physical ports are associated with two or more physical network addresses 414, 434. The SM is not involved in the traffic between the at least two host machines 120, 312, but the configuration information may be provided through the same IB network links 208 and therefore to the physical ports even if illustrated by separate lines in at least FIGS. 3 and 4.

In at least one embodiment, the SM 206 is further adapted to receive a request for communication, such as via the MAD or trap messaging 308. The request may be from a first one 120 of the at least two host machines and may specify a second one 312 of the at least two host machines as a destination host machine, for instance, of the communication. The SM is further to determine the different virtual network addresses 412, 432 to be associated with the first one of the at least two host machines and a second one of the at least two host machines. In at least one embodiment, the different virtual network addresses 412, 432 may be associated with the devices as part of a sweep performed by the SM of all the connected devices. The association between the virtual and physical network addresses is a mapping 418 stored in part of or a distinct table of the rail-based forwarding table. The SM is further to register the relationship 416 of the different virtual network addresses for the communication as part of or a distinct table of the rail-based forwarding table. The relationship 416 enables network links that exclusively use the two or more physical ports underlying the virtual network addresses of the relationship and the mapping.

In at least one embodiment, after a request for the communication, the SM 206 is further adapted to check that at least a second one 312 of the at least two host machines is associated with at least one of the different virtual network addresses. However, this check may be performed by each one of the host machines to be in communication. In at least one embodiment, the request for the communication may come from a virtual network address and so, the check may be performed only for the other parties to be associated together in the communication.

In at least one embodiment, a previous mapping may be in effect for the virtual and physical network addresses for the second one 312 of the at least two host machines. For example, the existence of the mapping 418 between LID C1 and LIDs A1 and B1 in the SM is indicative of a previous association. Thereafter, the registering of the relationship 416 of the different virtual network addresses LID C and LID C1 for the communication may be performed. For example, a first virtual address LID C of a first one 120 of the two host machines may be registered as related to a second virtual address LID C1 of the second one 312 of the two host machines, which exclusively groups the underlying physical ports LID A, LID B, LID A1, and LID B1 to provide network links to be used in the communication between the two host machines 120, 312. There may be other non-rail ports LID E and LID F remaining in at least one of the host machines 120 for non-rail communications in the IB network.

In at least one embodiment, an SM 206 is further adapted to determine that a second one 312 of the at least two host machines is to be associated with at least one of different virtual network addresses. This may be the case when no ports of the first one 312 of the at least two host machines are associated with a virtual network address. The SM is to enable the at least one of the different virtual network addresses by mapping the local port LIDs A1 and B1 to a virtual network address LID C1. The SM is further to then register a relationship of the different virtual network addresses LID C with LID C1 for the network links that exclusively use their underlying two or more physical ports for communication, based at least in part on a request for such communication between the at least two host machines 120, 312.

In at least one embodiment, a system herein includes one or more processing units to communicate configuration information between a SM and at least one switch. The processing units may be within an IB switch or an IB host that is able to function as an SM and may be within other IB devices having SMAs to communicate with the SM. The configuration information is to enable the at least one switch to provide communication between at least two host machines through a rail of network links that exclusively use two or more physical ports of the at least two host machines. The configuration information may be associated with a mapping and a relationship of different virtual network addresses of the underlying two or more physical ports. For example, the mapping may be between the different virtual network addresses and the two or more physical ports on the at least two host machines. The relationship may be between the different virtual network addresses to indicate that the underlying physical ports to the virtual network addresses are to be used exclusively in a rail of network links for the communication.

In at least one embodiment, the one or more processing units of the SM are further adapted to monitor individual ones of the two or more physical ports using trap messaging from at least one SMA. The trap messaging may provide status updates of the ports, for instance. The one or more processing units are further adapted to enable changes for the at least two host machines or the at least one switch, via the configuration information, based in part on a change indicated by at least one SMA to the SM, which causes the SM to update its rail-based forwarding table to remove the relationship between the at least two host machines. The SM can communicate this change to the respective SMAs.

Figure 5:
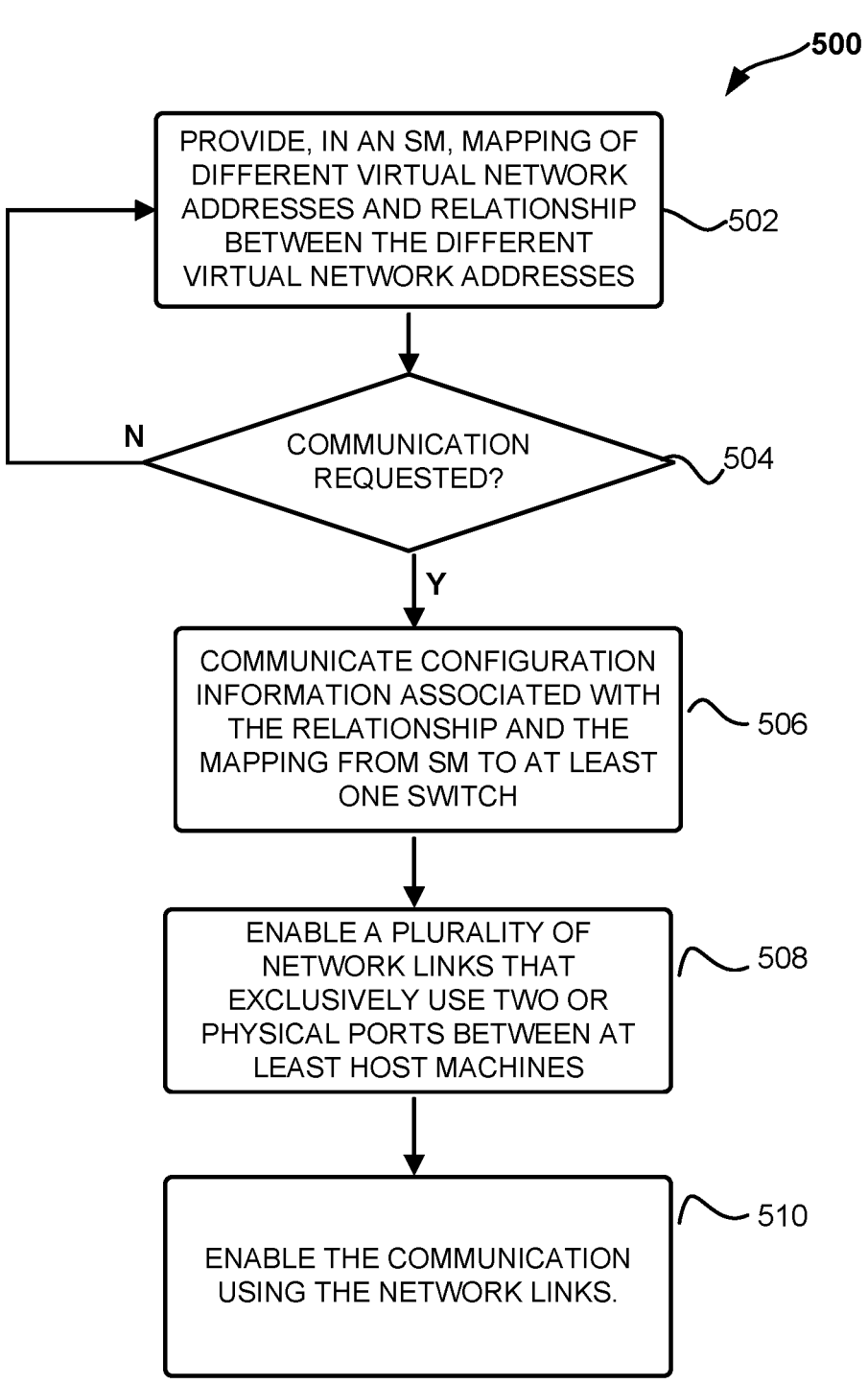
FIG. 5 illustrates a process flow for local port grouping for rails of network links in IB networks, according to at least one embodiment.

FIG. 5 illustrates a process flow or method 500 for local port grouping for rails of network links in IB networks, in at least one embodiment. The method 500 may be for local port grouping for at least two host machines in a network. The method 500 includes providing (502), in a subnet manager (SM), a mapping of different virtual network addresses to two or more physical ports on the at least two host machines and a relationship between the different virtual network addresses. In at least one embodiment, the two or more physical ports have respective physical network addresses.

In at least one embodiment, the method 500 includes verifying or determining (504) that communication is requested between the at least two host machines. For example, at least one of the two host machines can communicate a request for communication with a second one of the at least two host machines by identifying a destination network address for a physical port of the second one of the two host machines. The request may include a request for rails of network links to be established between the at least two host machines.

In at least one embodiment, the method 500 includes communicating (506) configuration information from the SM to at least one switch. However, there may be multiple switches in an IB network between the at least two host machines and so the communication of the configuration information from the SM may be to all such switches. The configuration information is associated with the mapping and the relationship of the different virtual network addresses. For example, the at least one switch determines that a mapping for the physical port of the second one of the two host machines exists with respect to a first virtual network address. The at least one switch can determine that the first virtual address is associated with a second virtual address related to the first one of the two host machines that is requesting the communication.

In at least one embodiment, the method 500 includes enabling (508) the at least one switch to use the configuration information to provide network links that exclusively use the two or more physical ports for communication between the at least two host machines. Once the network links are provided, the method 500 includes enabling (510) the two host machines to communicate using the network links. For example, the traffic between the at least two host machines need not reviewed by the SM, but passes directly between the at least two host machines without regard to the SM using the underlying virtual LIDs of the relationship, which in turn use the underlying physical LIDs of the mapping.

In at least one embodiment, the method 500 includes a further step or sub-step for the mapping and the relationship to be based in part on one or more of the at least two host machines requesting to communicate with each other. In at least one embodiment, the method 500 includes a further step or sub-step for monitoring individual ones of the two or more physical ports and to enable changes for the communication between the at least two host machines using the configuration information. The changes may be based in part on a request by at least one of the at least two host machines. For example, the request may be to cancel a rail of network links previously between the at least two host machines. The SM enables the change so that the communication does not use the rails of network links. The SM removes the relationship previously in the rail-based forwarding table and so the any further communication may occur without the rails.

In at least one embodiment, the method 500 includes a further step or sub-step for receiving, using an interface of the SM, a request for the communication. The interface may be a network interface to receive MAD and trap messages, for instance. The SM can update its rail-based forwarding table or register, in the rail-based forwarding table, at least the relationship between the different virtual network addresses based in part on the request. In at least one embodiment, the method 500 includes a further step or sub-step for assigning, using the SM, the virtual network addresses to the two or more physical ports on the at least two host machines.

In at least one embodiment, the method 500 includes a further step or sub-step for enabling, using an IB software service of the host machine or of an endpoint, the configuration information to be communicated between the SM and the SMAs of the two or more physical ports using MAD messaging. In at least one embodiment, such an IB software service is accessible to an administrator to configure changes for the IB network.

Figure 6:
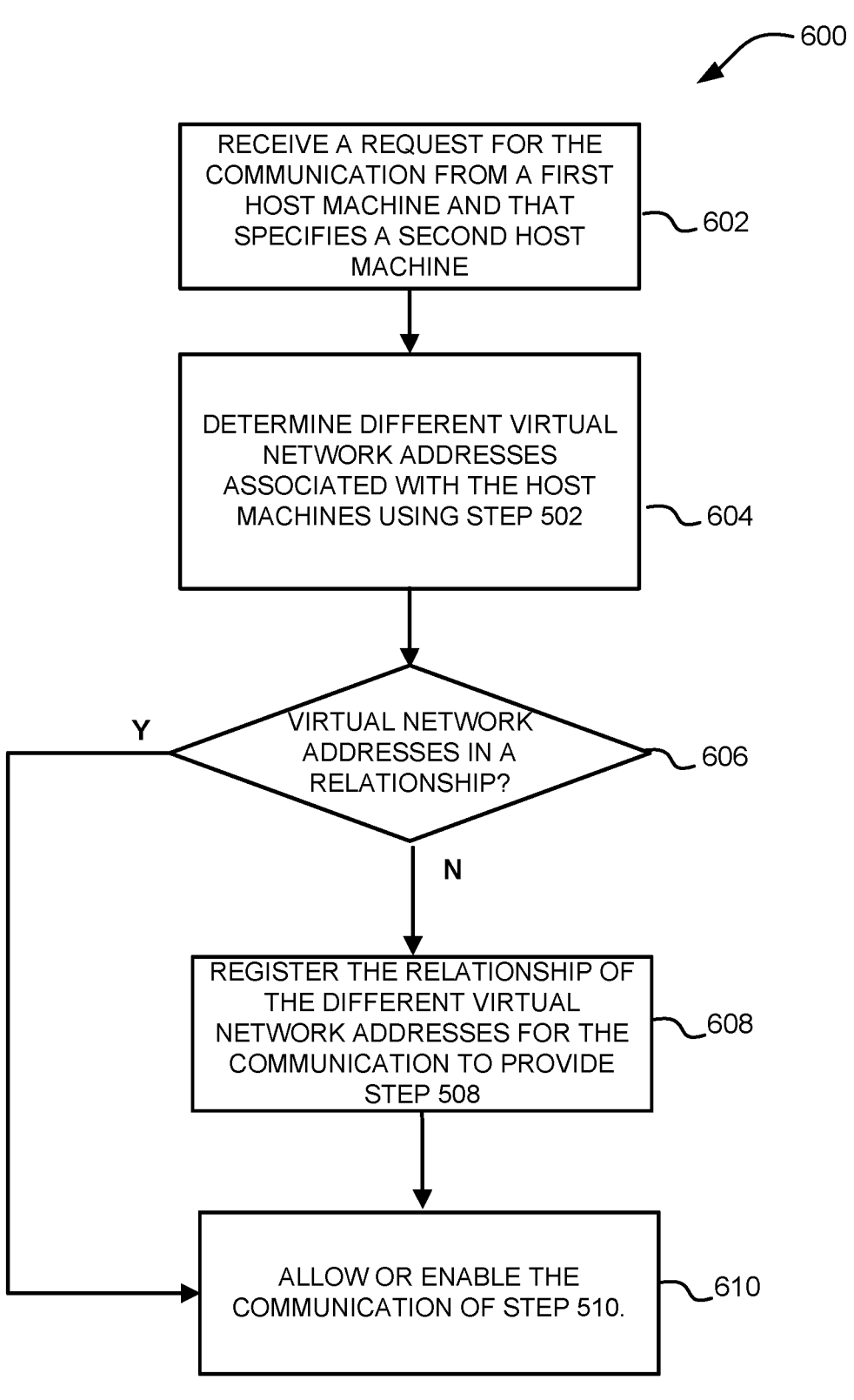
FIG. 6 illustrates process flow to support local port grouping for rails of network links in IB networks, according to at least one embodiment.

FIG. 6 illustrates process flow or method 600 to support local port grouping for rails of network links in IB networks, according to at least one embodiment. The method 600 includes receiving (602) a request for the communication. The request may be received in an SM. The request may be from a first one of the at least two host machines and may specify a second one of the at least two host machines. The second one of the at least two host machines may be specified by a destination LID that may be a physical LID of a port of the second one of the at least two host machines.

In at least one embodiment, the method 600 includes determining (604) different virtual network addresses associated with the first one of the at least two host machines and a second one of the at least two host machines. For example, the physical LID may be mapped to a virtual LID in an SM. Both host machines may have respective virtual LIDs that are different. The determination (604) may be performed using a mapping in the SM of the rail-based forwarding tables. A verification (606) may be performed in the method 600 for a relationship that may exist between the respective virtual LIDs. Communication may be allowed or enabled via step 610 based in part on the relationship existing between the respective virtual LIDs.

In at least one embodiment, however, the method 600 includes registering (608) the relationship of the different virtual network addresses or LIDs to provide network links that exclusively use underlying physical ports of the related virtual LIDs for the communication. The communication may be allowed or enabled (610) after the registering step 608. In at least one embodiment, the SM may monitor and update the rail-based forwarding table periodically to ensure the relationship exists or may check at a start of a period or session of communications using the physical or virtual LIDs associated with the communication till a change is detected to cause the communication to become non-rail communication or traffic.

In at least one embodiment, the method 600 includes a further step or sub-step for checking that a second one of the at least two host machines is associated with at least one of the different virtual network addresses as in step 606. The method 600 includes registering (608) the relationship of the different virtual network addresses to provide the rails of network links that exclusively use underlying physical ports to the related different virtual network addresses to provide the communication. The registering step 608 may be based in part on the request in step 602 for the communication.

Figure 7:
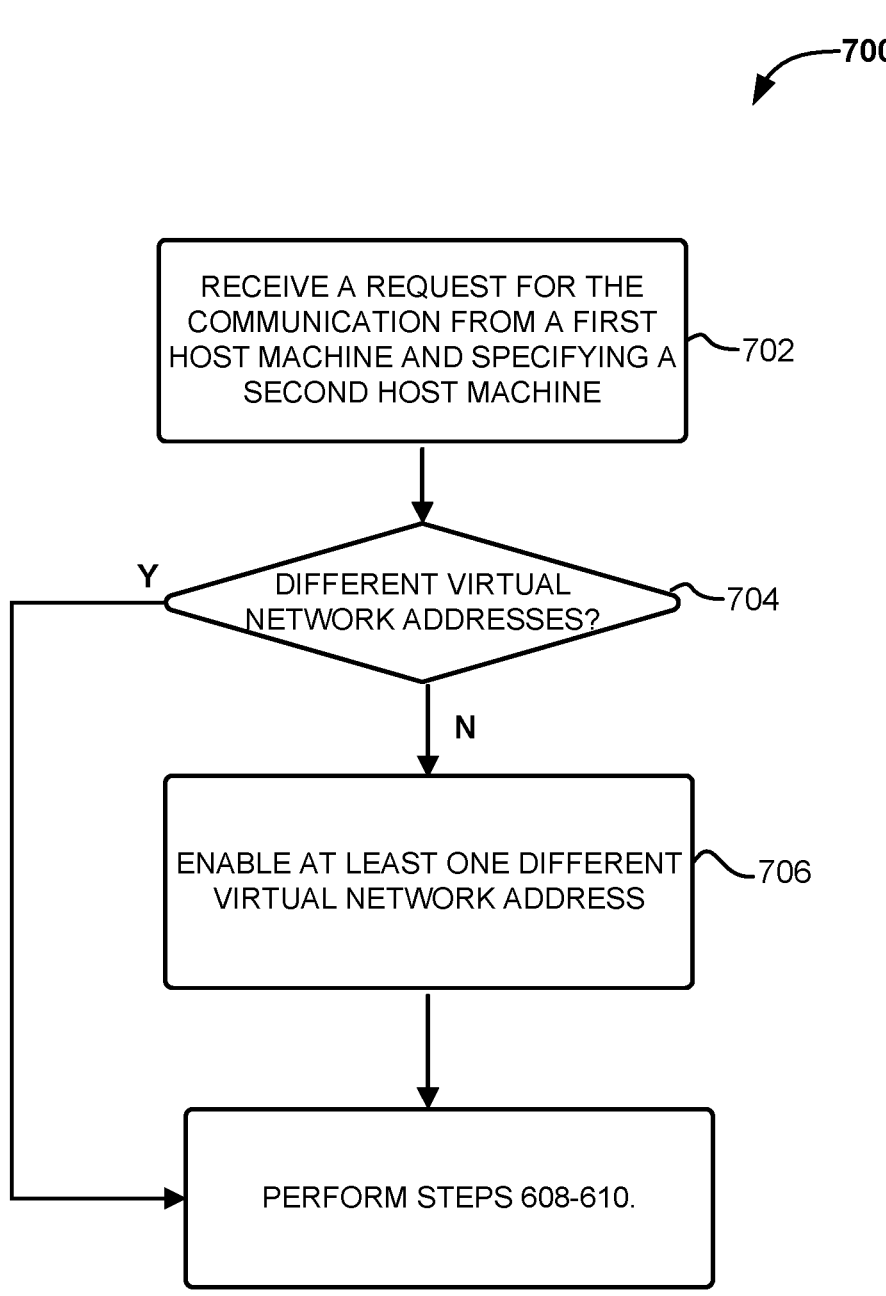
FIG. 7 illustrates a process flow to set up local port grouping for rails of network links in IB networks, according to at least one embodiment.

FIG. 7 illustrates a process flow or method 700 to set up local port grouping for rails of network links in IB networks, according to at least one embodiment. The method 700 includes receiving (702) a request for the communication, such as in a similar manner as step 602 in method 600. The request in step 702 may be similarly received in an SM. The request may be from a first one of the at least two host machines and may specify a second one of the at least two host machines. The method 700 includes verification or determination (704) that a first or a second one of the at least two host machines is to be associated with different virtual network addresses. The method 700 includes enabling (706) at least one of the different virtual network addresses. In at least one embodiment, the virtual network addresses are communicated from the SM to the SMAs or respective physical ports of the at least two host machines. The respective physical ports are the physical ports intended to be in the exclusively in a rail of network links so that communication between the at least two host machines can use the rail of network links. The method 700 includes performing step 608-610 to register the relationship of the different virtual network addresses enabled for the respective physical ports so that the rail of network links can support communication there through using the different virtual network addresses for the underlying respective ports.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. References may also be made to providing, outputting, transmitting, sending, or presenting analog or digital data. In at least one embodiment, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system for local port grouping for at least two host machines in a network, comprising:

a subnet manager (SM) to comprise a mapping of different virtual network addresses to two or more physical ports on the at least two host machines and to comprise a relationship between the different virtual network addresses, the mapping and the relationship to enable a plurality of network links that exclusively use the two or more physical ports; and at least one switch between the at least two host machines to receive configuration information from the SM, the configuration information associated with the mapping and the relationship of the different virtual network addresses and the configuration information to enable the at least one switch to provide communication between the at least two host machines through the plurality of network links.

2. The system of claim 1, wherein the mapping and the relationship are based in part on one or more of the at least two host machines requesting to communicate with each other.

3. The system of claim 1, wherein the SM is further configured to:

monitor individual ones of the two or more physical ports; and enable changes for the communication between the at least two host machines, via the configuration information, based in part on a request by at least one of the at least two host machines.

4. The system of claim 3, further comprising:

an interface of the SM to receive a request to for the communication, wherein the SM is to update or register at least the relationship between the different virtual network addresses based in part on the request.

5. The system of claim 1, wherein the SM is enabled to assign the different virtual network addresses to the two or more physical ports on the at least two host machines.

6. The system of claim 1, further comprising:

an InfiniBand (IB) software service of the at least two host machines or of an endpoint to enable the configuration information to be communicated between the SM and a plurality of subnet management agents (SMAs) of the two or more physical ports using management datagram (MAD) messaging.

7. The system of claim 6, wherein responses to the MAD comprises one or more of:

trap messaging for notifying the SM for the different virtual network addresses to the two or more physical ports;

trap messaging requesting for the different virtual network addresses to the two or more physical ports;

trap messaging for notifying the SM about changes to the different virtual network addresses of the two or more physical ports; or trap messaging notifying about the communication.

8. The system of claim 6, wherein the MAD messaging comprises two or more physical network addresses of the two or more physical ports in a source and destination address header field.

9. The system of claim 1, wherein the SM is further configured to:

receive a request for the communication, the request from a first one of the at least two host machines and specifying a second one of the at least two host machines; and determine the different virtual network addresses associated with the first one of the at least two host machines and a second one of the at least two host machines; and register the relationship of the different virtual network addresses for the communication.

10. The system of claim 1, wherein the SM is further configured to:

receive a request for the communication, the request from a first one of the at least two host machines and specifying a second one of the at least two host machines;

check that a second one of the at least two host machines is associated with at least one of the different virtual network addresses; and register the relationship of the different virtual network addresses for the communication using the at least one of the different virtual network addresses.

11. The system of claim 1, wherein the SM is further configured to:

receive a request for the communication, the request from a first one of the at least two host machines and specifying a second one of the at least two host machines;

determine that a second one of the at least two host machines is to be associated with at least one of the different virtual network addresses;

enable the at least one of the different virtual network addresses; and register the relationship of the different virtual network addresses for the communication using the at least one of the different virtual network addresses.

12. A method for local port grouping for at least two host machines in a network, the method comprising:

providing, in a subnet manager (SM), a mapping of different virtual network addresses to two or more physical ports on the at least two host machines and to comprise a relationship between the different virtual network addresses;

communicating configuration information from the SM to at least one switch, the configuration information associated with the mapping and the relationship of the different virtual network addresses; and enabling, using the mapping and the relationship, a plurality of network links that exclusively use the two or more physical ports for communication between the at least two host machines.

13. The method of claim 12, wherein the mapping and the relationship are based in part on one or more of the at least two host machines requesting to communicate with each other.

14. The method of claim 12, further comprising:

monitoring individual ones of the two or more physical ports; and enabling changes for the communication between the at least two host machines, via the configuration information, based in part on a request by at least one of the at least two host machines.

15. The method of claim 12, further comprising:

receiving, using an interface of the SM, a request for the communication; and updating or registering, in the SM, at least the relationship between the different virtual network addresses based in part on the request.

16. The method of claim 12, further comprising:

assigning, using the SM, the different virtual network addresses to the two or more physical ports on the at least two host machines.

17. The method of claim 12, further comprising:

enabling, using an InfiniBand (IB) software service of the at least two host machines or of an endpoint, the configuration information to be communicated between the SM and a plurality of subnet management agents (SMAs) of the two or more physical ports using management datagram (MAD) messaging.

18. The method of claim 17, wherein responses to the MAD comprises one or more of:

trap messaging for notifying the SM for the different virtual network addresses to the two or more physical ports;

trap messaging requesting for the different virtual network addresses to the two or more physical ports;

trap messaging for notifying the SM about changes to the different virtual network addresses to the two or more physical ports; or trap messaging notifying about the communication.

* * * * *